W. J. NEWMAN.
APPARATUS FOR TRANSPORTING AND DUMPING MATERIAL.
APPLICATION FILED OCT. 6, 1913.
1,134,151.
Patented Apr. 6, 1915.
2 SHEETS—SHEET 1.
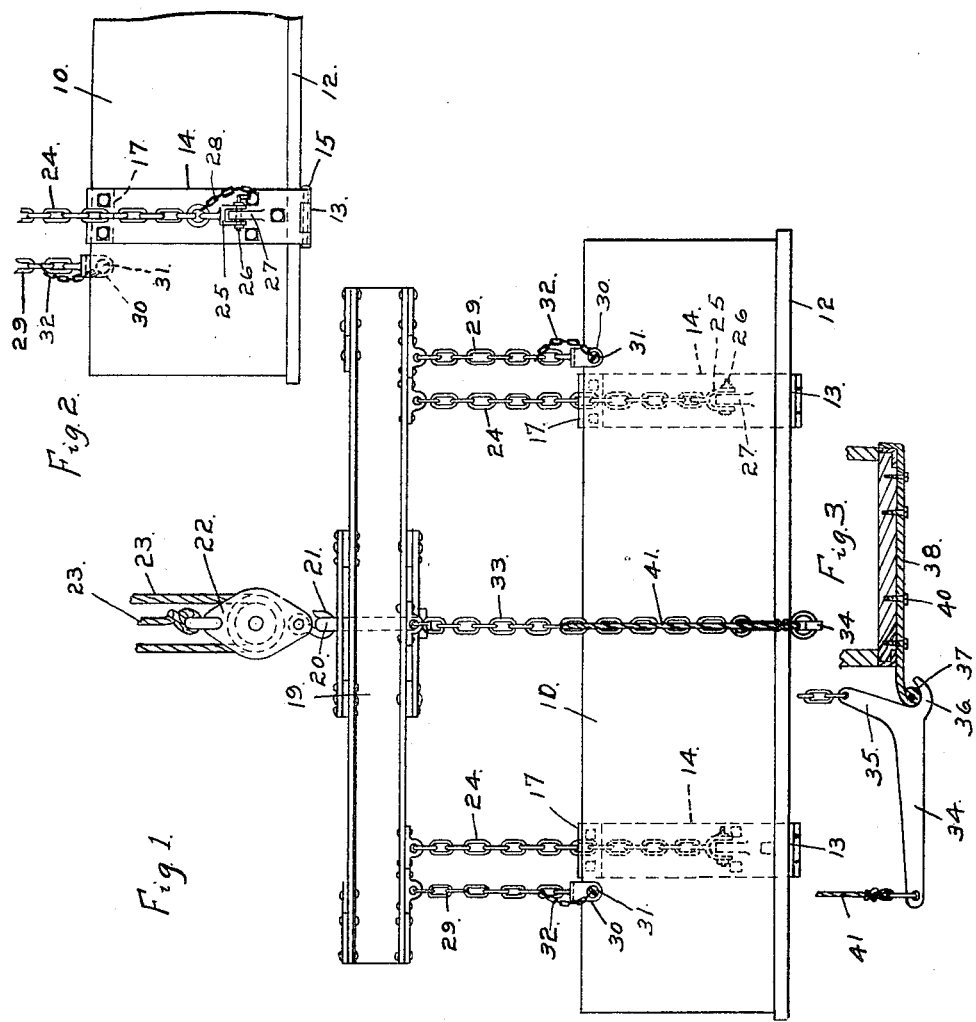

W. J. NEWMAN.
APPARATUS FOR TRANSPORTING AND DUMPING MATERIAL.
APPLICATION FILED OCT. 6, 1913.
1,134,151.
Patented Apr. 6, 1915.
2 SHEETS—SHEET 2.
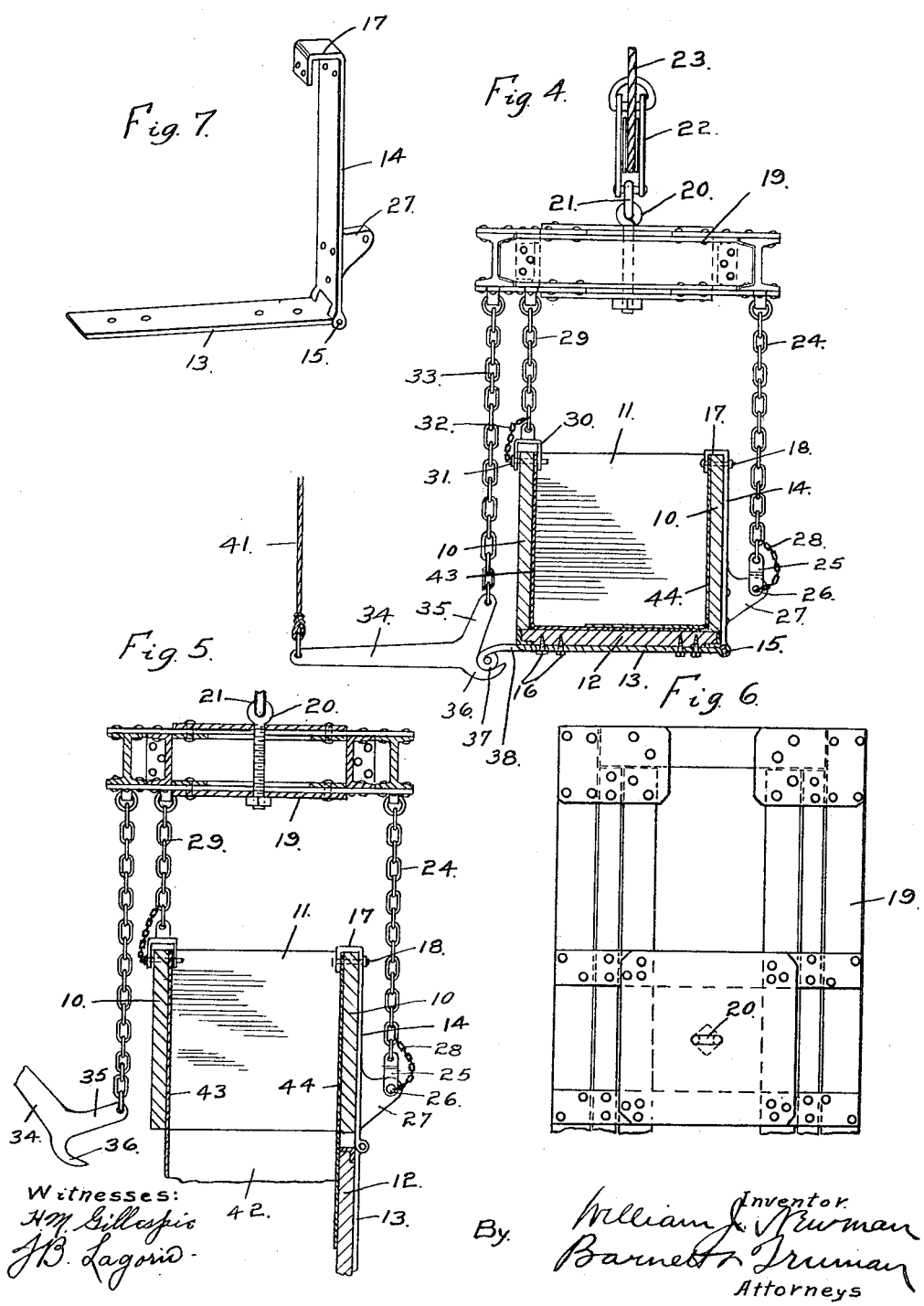

UNITED STATES PATENT OFFICE.

WILLIAM J. NEWMAN, OF CHICAGO, ILLINOIS.

APPARATUS FOR TRANSPORTING AND DUMPING MATERIAL.

1,134,151. Specification of Letters Patent. Patented Apr. 6, 1915.

Application filed October 6, 1913. Serial No. 793,751.

*To all whom it may concern:*

Be it known that I, WILLIAM J. NEWMAN, a citizen of the United States, residing at Chicago, in the county of Cook and State of Illinois, have invented certain new and useful Improvements in Apparatus for Transporting and Dumping Material, of which the following is a specification.

My invention relates to apparatus for transporting and dumping material in bulk, such as earth, clay, sand, debris, and the like, and the primary object of the invention is to provide a new and improved apparatus of this sort comprising a container for the material and means for raising and dumping the same, the container being so constructed that in the transportation of material to the place of dumping it may be used in connection with and to form a part of an ordinary wagon, car or other similar vehicle. My Patent No. 731,118 shows an apparatus of this general character designed for handling all sorts of material, but particularly heavy, sticky substances such as the blue clay met with in excavation work in certain parts of the country. In the apparatus shown in the patent special provision is made for the complete discharge of material of this sort by certain arrangements which effect a relative movement between the body or main portion of the box and its bottom before the bottom is dropped to dump the load. For certain materials and under certain conditions this arrangement is not absolutely essential and my present invention provides a form of apparatus which does not have this feature and which for that reason can be simplified and hence its cost of construction reduced.

In order that a container for relatively large quantities of heavy material handled in bulk should be capable of use in connection with the running gear of an ordinary wagon or car to take the place of the usual wagon or car body or box, and in order that it should also be capable of being raised from its running gear, moved to a suitable place for dumping and its contents discharged without being racked, pulled loose at the joints and soon rendered useless, such container must be both light and strong and in addition, should not be encumbered by projecting parts likely to interfere with the use of the wagon or car of which such container for most of the time forms a part.

My invention provides a simple and economically constructed container or vehicle body answering to these requirements and a suitable apparatus for raising the same from its running gear and discharging the load therefrom.

The invention is described, in a preferred embodiment, in the accompanying drawings in which—

Figure 1 is a side view of the container and the apparatus for dumping the same; Fig. 2, a fragmentary view of the other side of the same; Fig. 3, a detail cross sectional view showing particularly the trip and its engagement with the hinged bottom of the vehicle body; Figs. 4 and 5, transverse sectional views of the apparatus showing the bottom in the closed and open positions, respectively, Fig. 6, a fragmentary plan view of the lifting frame forming a part of the dumping apparatus, and Fig. 7, a perspective view of one of the hinges employed for hinging the bottom to the body of the vehicle box.

Like characters of reference designate like parts in the several figures of the drawings.

Referring to the drawings, the container or vehicle body is shown as consisting of an oblong box composed of sides 10 and ends 11 and provided with a hinged bottom 12. The box is preferably made of wood for the sake of lightness. The bottom is connected with the body of the box by one or more hinges, preferably of the construction detailed in Fig. 7. One leaf 13 of the hinge, connected with the other leaf 14 by a pintle 15, extends clear across the bottom of the box and is secured thereto by suitable screws 16 or other securing devices. The leaf 14 extends up one side 10 of the box and is bent over the upper edge thereof, as indicated at 17, and fastened to the wood by bolts 18. The box thus constructed may be placed upon the running gear of an ordinary wagon so as to form the body or box of the wagon. The box of the wagon may be filled in the ordinary manner and then brought to the place of dumping. The body of the wagon is then lifted from the running gear and its contents dumped by apparatus preferably constructed as follows:

19 designates a rectangular frame of any preferred construction having centrally thereof an I-bolt 20 engaged by the hook 21 of a fall block 22, the cable of which is indicated at 23. Suspended from one side of the frame 19 are chains, preferably two in number, 24 terminating in clevises 25 which latter are adapted to extend over and be secured by means of pins 26 to lugs or projections 27 on the leaves 14 of the hinges by which the bottom of the box is hinged to the body the lugs being perforated to form eyes. The pins are preferably secured to chains 24 by similar chains 28. On the other side of the frame are suspended chains 29 having at their lower ends clevises 30 adapted to extend over the upper edges of the side member of the box and to be secured to the box by pins 31 which extend through perforations in the box and in the clevises, the pins 31 being preferably attached to chains 29 by short chains 32. The chains 29 are intended only to serve as means for supporting the box and steadying the same. They are not intended to take any of the weight of the load, the load being supported on one side by the chains 24 and on the other side by a chain 33 and a trip member 34 carried thereby, which trip member engages the free edge of the bottom of the box. The trip 34 consists of a bar having a lug 35 to which chain 33 connects, and a lip or nose 36 which extends under a projection 37 on a strip of metal 38 which extends across the bottom of the box is formed at the other end preferably with a flange 39 overlapping the edge of the bottom and is securely attached to the bottom, for example, by the screws 40. The trip is manipulated by a cable 41.

It will be seen that when the box is raised from the running gear, which is accomplished by winding up the cable forming a part of any preferred sort of derrick or lifting apparatus not shown, the bottom which takes the weight of the load is supported on one side by chain 33 and on the other side by the chains 24. All of these chains are connected to metal parts which extend across the bottom of the box from side to side, namely, the leaves 13 of the hinges and the strip 38, which metal parts, therefore, receive the stress of the load and support it at opposite ends and at the middle. This construction makes it possible to obtain a sufficiently strong box for dumping purposes which may be made, however, almost entirely out of wood so that it is light enough for use as an ordinary wagon body. When the supporting frame 19, with the box suspended therefrom, has been brought to the proper place for dumping, the dumping line 41 is pulled up, exerting an upward pull on the tripping rope 41 which draws the nose 36 of the trip out from under the projecting end 37 of the bar 38, and the bottom 12 swings down into the position shown in Fig. 5, dumping the load. The box, being supported on one side by the chains 24 and on the other by the chains 29, can swing as the load is discharged so as to diminish the shock on the parts. The box is returned to its running gear by folding in the bottom 12. The weight of the body of the box keeps it in place on the bottom.

In case the container is to be used for handling very sticky material, such as wet clay or material which contains free liquid likely to drip out through the joints of the box, the latter is provided with a lining, made of canvas, for example, consisting of end sheets 42 secured to the upper edges of the ends of the box and side sheets 43, 44 secured to the upper edges of the sides of the box. These sheets are longer than the depth of the box so that they overlap on the bottom of the box when the box is closed, as best shown in Fig. 4. The free ends of the sheet drop down when the bottom is dropped allowing the material in the box to be freely discharged.

While I have shown in the drawings ropes or cables for supporting certain parts of the apparatus and chains for supporting other parts, it will be obvious that chains might be substituted for the ropes or cables in the places shown and cables or ropes in the places where chains are used, although with possibly some slight inconvenience. In claiming the invention, for want of a suitable generic term, I have described these supporting elements in terms corresponding to the showing of the drawings but I do not intend thereby to limit the invention to the use in any particular situation of either a chain or a rope or cable.

I claim:

In apparatus for transporting and dumping material the combination with a supporting frame provided with means whereby it may be raised and lowered, of a vehicle box comprising a body part and a bottom, chains on one side of said supporting frame adapted to be detachably secured to one side of the vehicle body, a trip suspended from the same side of said supporting frame, a pair of chains on the other side of said supporting frame, a pair of hinges hinging the bottom to the body part of the vehicle box comprising in each case a leaf secured to the underside of the bottom and a leaf secured to the side of the body and formed with an eye, said last mentioned pair of chains being adapted to be detachably secured to the eyes formed on said hinges, and a metal bar secured to the bottom between said hinges and furnished at the end opposite to the hinged edge of the bottom with means adapted to be detachably engaged by said trip.

WILLIAM J. NEWMAN.

Witnesses:
L. A. FALKENBERG,
J. B. LAGORIO.

Copies of this patent may be obtained for five cents each, by addressing the "Commissioner of Patents, Washington, D. C."